United States Patent [19]
Knauf

[11] Patent Number: 5,691,022
[45] Date of Patent: Nov. 25, 1997

[54] RELEASE LINER BASE STOCK FOR PRINTED FILMS OR LABELS

[75] Inventor: Gary H. Knauf, Appleton, Wis.

[73] Assignee: International Paper Company, Tuxedo Park, N.Y.

[21] Appl. No.: 627,812

[22] Filed: Apr. 10, 1996

Related U.S. Application Data

[63] Continuation-in-part of Ser. No. 326,501, Oct. 20, 1994.

[51] Int. Cl.[6] .......................................................... C09J 7/02
[52] U.S. Cl. ........................ 428/40.1; 283/81; 428/41.3; 428/41.4; 428/41.5; 428/41.7; 428/41.8; 428/352; 428/353; 428/354; 428/447
[58] Field of Search ........................... 428/40.1, 41.3, 428/41.4, 41.5, 41.7, 41.8, 352, 354, 353, 447; 283/81

[56] References Cited

U.S. PATENT DOCUMENTS

| | | | |
|---|---|---|---|
| 3,896,249 | 7/1975 | Groff et al. | 253/454 |
| 3,896,294 | 7/1975 | Keeling et al. | 428/202 |
| 4,609,589 | 9/1986 | Hosoda | 428/352 |
| 4,783,354 | 11/1988 | Fagan | 428/40.1 |

*Primary Examiner*—Nasser Ahmad
*Attorney, Agent, or Firm*—Michael J. Doyle; Stewart L. Gitler

[57] ABSTRACT

A release liner based stock for use as a carrier web including a paper substrate having an upper surface and a lower surface. A release agent is coating on the top of the upper surface. The unique soap-based acrylic layer discourages curling of the base stock release liner, fiber pick-off contamination from the uncoated side of the paper substrate, and maintains a consistent peel off force required for removing a label from the release liner and deploying it on a target object.

21 Claims, 1 Drawing Sheet

RELEASE LINER BASE STOCK FOR PRINTED FILMS OR LABELS

REFERENCE TO CO-PENDING APPLICATION

The present application is a continuation-in-part application of U.S. patent application Ser. No. 08/326,501, filed Oct. 20, 1994, now pending, by Gary H. Knauf.

FIELD OF THE INVENTION

The invention relates to release liner base stocks which are used as a carrier web to dispense die cut film labels onto glass and plastic bottles. More particularly, there is disclosed a reduced curl release liner and base stock which acts as a carrier for printed films and labels. The release liner is wound up and discarded at the end of the labelling process.

BACKGROUND OF THE INVENTION

The current release liner base stock on the market consists of a substrate material such as an unbleached kraft type paper and extrusion coated thereon a layer of a polymer resin. The polymer layer, which has been coated onto the paper, is then coated with a silicone type material which acts as the release layer. The release liner is sent to a laminator where adhesive is coated onto the silicone release layer. A film label material is laminated to the release liner. The release liner and film label laminate is then sent to a printer, that prints on the film in roll form. The final step is for rolls, of the assembled laminate, release liner and printed film label, to be die cut and dispensed onto bottles or the like. The die cut is made through the film, the adhesive, and partly into the polymer coating layer. The release liner acts as a carrier for the film labels and is wound up and discarded at the end of the labelling process.

A problem with the existing release liner base stock is that loose fibers from the paper side of the liner get picked off and contaminate the polymer layer and printed film or label layer surfaces during silicone coating, adhesive laminating, and printing operations. Manufacturing machines used for the process have to be taken out of production to manually clean the paper fiber from coating and printing cylinders.

Another problem with the current release liner base stock is that during the adhesive laminating step, the heat that is supplied to the web causes the liner to curl in the cross machine direction due to shrinkage of the polymer coating. To eliminate this curl, water or steam has been applied to the paper side of the sheet. This application is an expensive and an inefficient added step to the process.

A further problem with the current release liner base stock is that acrylic constituents of layers included in similar types of inventions are soap-free. Soap-free acrylics tend to react with silicone, commonly employed in release layers. The soap-free acrylic-silicone reaction causes increased adhesion between the label and a release liner. Increased adhesion reduces the ease with which labels constructed in this manner may be peeled from base stock and deployed no an object. For example, U.S. Pat. No. 4,609,589, issued Sep. 2, 1986, to Y. Hosoda et al., describes a release sheet comprising a paper substrate with soap-free acrylic resin rotated thereon. A silicone based release layer is coated on top of this undercoat.

Similarly, U.S. Pat. No. 4,783,354, issued Nov. 8, 1988, to J. P. Fagan, describes an adherable, yet removable sheet material which employs a pressure-sensitive acrylic coating. The specific acrylic coating compounds include CARBOTAC 26171 and CARBOTAC 26222. These compounds are aimed primarily at providing "excellent adhesion" whereas acrylic compounds in the present invention are targeted primarily at providing "release coatings."

In U.S. Pat. No. 3,896,294, issued Jul. 22, 1975, to R. A. Keeling et al., an acrylic layer functions to bond a label to target surface whereas in the present invention, the acrylic layer serves to maintain a reduced adhesion between a release layer and a label.

U.S. Pat. No. 3,896,249, issued Jul. 22, 1975, to G. L. Groff et al., describes a pressure sensitive adhesive tape which employs an acrylic based adhesive layer disposed on the paper substrate. As with the Keeling et al. invention, the acrylic adhesion, rather than maintaining or reducing the peel forces required to peel a label from the release liner.

One object of the present invention is to reduce the fiber contamination problem by applying a specialized coating to the uncoated side of the paper substrate of the release liner base stock. The specialized coating covers and protects the paper fibers. This coating also significantly reduces the amount of curl in the liner, thereby significantly reducing the amount of steam that needs to be applied to the sheet during the adhesive lamination process.

Another object of the invention is to improve the efficiency of coating, laminating, and printing equipment by significantly reducing fiber pick-off contamination from the uncoated side of the paper substrate of the release liner base stock.

A further object of the present invention is the reduction of cross-directional curl of the liner paper.

An additional object of the invention is to provide a specialized coating that will not effect the peel strength properties of the release layer, thus provide consistent adhesion between a label and a release liner base stock for consistent peel force requirements when deploying a label.

SUMMARY OF THE INVENTION

The present invention provides for a release liner base stock for use as a carrier web to dispense dye cut film labels onto glass and plastic bottles. The base stock includes a paper substrate having an upper surface and a lower surface. The release agent is coated on top of the upper surface of the base stock. An undercoating is coated under the lower surface of the base stock. The release agent and the undercoating are always on opposite surfaces of the substrate, never adjacent to one another. An adhesive is deposited on the release agent. A film label is disposed on the adhesive.

BRIEF DESCRIPTION OF THE DRAWINGS

The invention will be better understood from the following detailed description considered in conjunction with the attached drawings in which.

DETAILED DESCRIPTION OF THE INVENTION

The terminology "label or printed film" (face sheet) is used throughout this description to denote all sheet products, regardless of size or configuration, which were designed to be affixed to a glass bottle, plastic bottle, or the like. The term "release liner base stock or carrier web" is used herein to describe a unique composite structure which has a paper substrate, a coating layer such as a polypropylene polymer material extrusion coated or the like on its upper surface and a sealing coating layer such as an acrylic latex polymer resin coated on the paper's lower surface. The term "release liner" is used herein to describe a composite structure which includes a release agent, such as silicone, coated on the extrusion coated surface of polypropylene of the release liner carrier web. The release agent permits a transfer adhesive agent to be attached to the release liner base stock or carrier web. This transfer adhesive has placed thereon a printed film or label and transfers from the release liner to the back of the label for subsequent affixation to glass bottles or the like.

Figure 1:
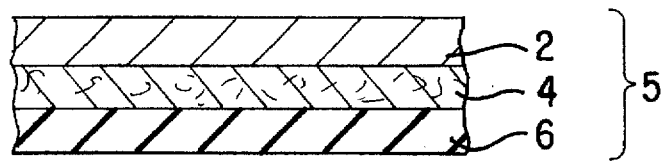
FIG. 1 is a cross-sectional view, greatly enlarged, of one embodiment of the reduced curl release liner base stock of the invention.

FIG. 1 shows a release liner base stock or carrier web of the invention, generally designated by reference numeral 5. The release liner carrier web includes a sheet of paper 4 having a coating 2 on its upper surface and a protective sealing coating 6 on its lower surface.

Coating layer 2 which is preferably applied by extrusion coating techniques, can be a polypropylene homopolymer, a polypropylene copolymer, or a low density polyethylene-polypropylene blended polymer resin. This coating can be placed on either side of an untreated paper and is preferably coated to a machine glazed side to maximize coating smoothness. A minimum coating weight of approximately 7 lbs/3MSF is preferable. Lower coating weights will produce excessive pinholes and poor adhesion to the base paper. If desired, corona discharge treatment and liquid polymers could be added to enhance the adhesion of the polypropylene type material coating to the paper.

Paper substrate layer 4 may be made from any fiber cellulose material in sheet form, but is preferably made from kraft paper. The paper can be bleached or unbleached and can be, if desired, machine glazed or machine finished. One of the principal purposes of sheet 4 is to provide a structural layer for the release liner carrier web, and release liner. Once the printed film or label is applied, the layer acts as a structural support for the entire composite. Accordingly, layer 4 is preferably a paper which is machine glazed and has a caliper thickness ranging from 2.9 mils to about 3.5 mils after the paper has been coated with the polypropylene based material and the protective sealing polymer layer 6.

The sealing coating layer 6 is applied to the underside or bottom of the paper and can be applied either to the rough or smooth side of the paper layer.

The sealing coating formulation is preferably a soap-based acrylic latex polymer material that hardens to prevent the surface fibers from the paper from being easily removed therefrom. The soap-based acrylic latex formulation coating preferably comprises water, an acrylic polymer latex resin, such as HIGHCAR 26348 sold by B.F. Goodrich Corporation and a defoamer which is a group of surfactants such as that sold by Witco as Bubble Breaker 748. Any suitable acrylic latex polymer resin would accomplish the preferred task as would any suitable defoaming material.

Further, one could utilize in place of the soap-based acrylic latex polymer resin a polyvinylidene dichloride, polyvinyl alcohol, starch, or styrene butadiene rubber (SBR) latex as the sealing coating layer.

The coating must completely cover the surface fibers and have a coating weight preferably ranging from 0.5 lbs/3MSF to 5 lbs/3MSF.

The unique release liner base stock or carrier web resists curling and prevents paper fibers from contaminating a subsequently applied silicone release agent layer and the resultant printed film or label applied thereto.

The amount of steaming or wetting done to the lower side of the paper during adhesive laminating step is significantly reduced.

Figure 2:
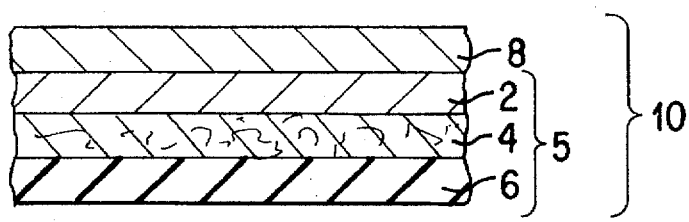
FIG. 2 is a cross-sectional view, greatly enlarged, of one embodiment of the reduced curl release liner base stock of the invention.

FIG. 2 illustrates a release liner base stock 5, as described above, having a silicone release agent layer 8 coated thereon to form an unique release liner 10. Release agent 8 serves the function of providing an unique surface for application thereon of a transfer adhesive which will allow a printed film or label to be placed thereon for subsequent removal. The release agent permits the adhesive to be placed thereon in a light fashion but prevents the adhesive from sticking fast to the release liner composite 10. The specific release agent used on the release liner carrier web is preferably a silicone material. A number of commercial curable silicones are available for this purpose, including SYL-OFF 23, a curable silicone rubber polymer manufactured by Dow Corning Company, and radiation curable type RC-450 silicone, sold by Goldschmidt Company.

A key consideration in selecting the acrylic formulation of the sealing coating layer 6 and the release agent layer 8, of the present invention, is the non-reactivity between these two layers. It is well known in the art that when soap-free acrylics inhibit the cross-linking cure reaction of the silicone, the silicone becomes more adhesive with respect to adjacent layers. This adhesive characteristic increase with time. In the present invention, although the sealing coating and the silicone layer are disposed on opposite sides of the substrate, they are in direct contact when wound in roll form. Since the co-mingling of the two materials is inevitable, the present invention employs a soap-based acrylic, which is well known in the industry to be non-reactive with silicone.

Figure 3:
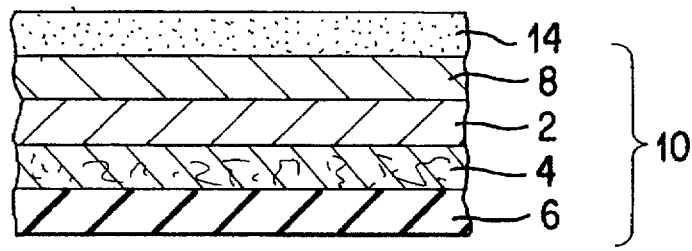
FIG. 3 is a cross-sectional view, greatly enlarged, of one embodiment of the reduced curel release liner base stock with transfer adhesive agent applied thereon.

FIG. 3 illustrates a release liner composite 10 as shown in FIG. 2 and described above in combination with a transfer adhesive 14 applied thereon.

Adhesive 14 is preferably a moisture impermeable pressure sensitive adhesive. As noted, when the label or printed film is attached to the release liner 10, adhesive 14 transfers to the printed film for subsequent application to a glass bottle or the like.

Figure 4:
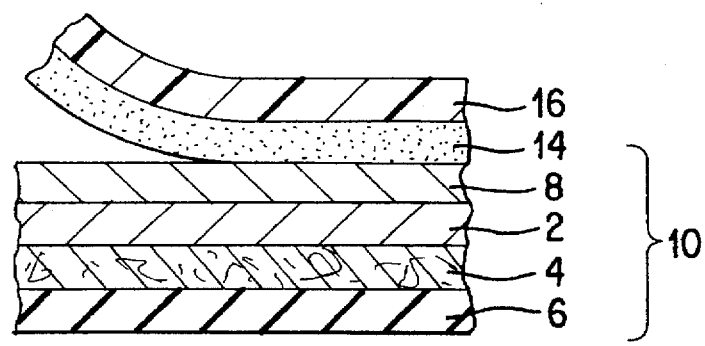
FIG. 4 is a cross-sectional view, greatly enlarged, of one embodiment of the printed film or label and transfer agent with release liner base stock of the invention showing the printed film or label and adhesive being pulled away therefrom.

FIG. 4 illustrates a printed film or label 16 with a transfer adhesive 14 being removed from the release liner 10. The printed film or label 16 may be made from any moisture insensitive material such as treated paper or a polymeric film sheet. As noted, the full benefit of using the reduced curling, non-contaminating release liner carrier web is realized when the face sheet of the printed film is adhesively laminated to the release liner 10.

The release base stock or carrier web is produced through a simple but unique multi-step line process. The paper substrate is coated through techniques such as extrusion coating with a polypropylene type material as described above. Further down the line, a protective sealing coating formulation, such as an acrylic latex polymer resin is applied as a liquid onto the uncoated underside of the paper and then dried. In this fashion, the unique release liner carrier web or base stock is formed.

The release liner base stock is then coated on its upper polypropylene side with a silicone or the like type release agent.

To this release agent there is applied a transfer adhesive which adheres lightly to the silicone release agent layer. The printed film or label is then applied to the transfer adhesive and the entire sandwich composite is formed. The printed film or label is then removed and the adhesive transfer material remains with the printed film or label so that application to a glass bottle or the like can be accomplished.

Although the invention has been described by reference to the specific embodiments, the invention is not limited thereto and variations of the product of the embodiments are contemplated. For example, the release liner may be constructed by adding additional coating materials between the acrylic latex polymer coating layer and the substrate. The scope of the invention is limited only by the breadth of the appended claims.

I claim:

1. A release liner base stock, for dispensing die cut film labels onto a surface, comprising:
   a paper substrate having a front side and a back side;
   a polypropylene coating layer located on said front side of said paper substrate; and
   a protective sealant layer located on said back side of said paper substrate selected from the group consisting of:
   a soap-based acrylic resin, polyvinylidene dichloride, starch, styrene butadiene rubber latex;
   and polyvinyl alcohol located on said back side of said paper substrate.

2. A release liner base stock as claimed in claim 1, further comprising
   a silicone coating layer located on said polypropylene coating layer.

3. A release liner base stock as claimed in claim 1, wherein said protective sealant layer is a soap-based acrylic polymer latex resin composition comprising:
   water;
   an acrylic latex resin; and
   a defoamer compound.

4. A release liner base stock as claimed in claim 3, wherein said soap-based acrylic resin coating weight ranges from 0.5 lbs./3MSF to 5.0 lbs./3MSF.

5. A release liner base stock as claimed in claim 1, wherein said paper substrate is bleached or unbleached and comprises a caliper thickness ranging from 2.9 mils to 3.5 mils.

6. A release liner base stock as claimed in claim 1, wherein said polypropylene coating layer is a polypropylene homopolymer, polypropylene copolymer or a low density polyethylene polypropylene blend.

7. A release liner base stock as claimed in claim 6, wherein said minimum coating weight of said polypropylene coating layer is 7 lbs/3MSF.

8. A label comprising a printed film having a printable upper surface and adhesive coated lower surface, and a release liner as claimed in claim 1.

9. The printed film as claimed in claim 8 wherein the release layer comprises a silicone polymer layer and a polypropylene coating layer, wherein the polypropylene coating layer is in direct contact with the paper substrate.

10. The printed film as claimed in claim 8 wherein said protective sealant layer is a soap-based acrylic resin composition comprising water, an acrylic latex resin, and a defoamer compound.

11. A release liner base stock, for dispensing die cut film labels onto a surface, consisting of:
    a paper substrate having a front side and a back side;
    a polypropylene coating layer located on said front side of said paper substrate; and
    a protective sealant layer located on said back side of said paper substrate selected from the group consisting of: an acrylic resin, polyvinylidene dichloride, and polyvinyl alcohol located on said back side of said paper substrate.

12. A release liner base stock consisting of as claimed in claim 11, further consisting of a silicone coating layer located on said polypropylene coating layer.

13. A release liner base stock as claimed in claim 11, wherein said protective sealant layer is an acrylic polymer latex resin composition comprising:
    water;
    an acrylic latex resin; and
    a defoamer compound.

14. A release liner base stock as claimed in claim 13, wherein said acrylic resin coating weight ranges from 0.5 lbs./3MSF to 5.0 lbs./3MSF.

15. A release liner base stock as claimed in claim 11, wherein said acrylic resin is soap-based.

16. A label consisting of a printed film having a printable upper surface and adhesive coated lower surface, and a release liner as claimed in claim 11.

17. The printed film as claimed in claim 16 wherein the release layer comprises a silicone polymer layer and a polypropylene coating layer, wherein the polypropylene coating layer is in direct contact with the paper substrate.

18. The printed film as claimed in claim 16 wherein said protective sealant layer is an acrylic resin composition comprising water, an acrylic latex resin, and a defoamer compound.

19. The printed film as claimed in claim 16, wherein said protective sealant is soap-based.

20. A release liner base stock as claimed in claim 11, said protective sealant layer located on said back side of said paper substrate further being selected from the group consisting of starch and styrene butadiene rubber latex.

21. A label as claimed in claim 19, said protective sealant layer located on said back side of said paper substrate further being selected from the group consisting of starch and styrene butadiene rubber latex.

* * * * *